US009969911B2

(12) United States Patent
Nakada et al.

(10) Patent No.: US 9,969,911 B2
(45) Date of Patent: May 15, 2018

(54) HOT-MELT ADHESIVE COMPOSITION

(71) Applicant: KURARAY CO., LTD., Kurashiki-shi (JP)

(72) Inventors: Kanayo Nakada, Tsukuba (JP); Moe Kawahara, Tsukuba (JP); Yoshihiro Morishita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 55 days.

(21) Appl. No.: 15/031,224

(22) PCT Filed: Oct. 20, 2014

(86) PCT No.: PCT/JP2014/077777
§ 371 (c)(1),
(2) Date: Apr. 21, 2016

(87) PCT Pub. No.: WO2015/060224
PCT Pub. Date: Apr. 30, 2015

(65) Prior Publication Data
US 2016/0244647 A1    Aug. 25, 2016

(30) Foreign Application Priority Data

Oct. 25, 2013 (JP) ................................ 2013-222489

(51) Int. Cl.
*C09J 153/00* (2006.01)
*C09J 133/06* (2006.01)
*G09F 3/10* (2006.01)
*C08F 297/02* (2006.01)

(52) U.S. Cl.
CPC ......... *C09J 153/00* (2013.01); *C08F 297/026* (2013.01); *C09J 7/22* (2018.01); *C09J 7/35* (2018.01); *C09J 133/06* (2013.01); *G09F 3/10* (2013.01); *C09J 2201/122* (2013.01); *C09J 2201/61* (2013.01); *C09J 2203/334* (2013.01); *C09J 2453/00* (2013.01)

(58) Field of Classification Search
CPC .............................. C09J 153/00; C08F 297/026
See application file for complete search history.

(56) References Cited

U.S. PATENT DOCUMENTS

| 5,264,527 | A  | 11/1993 | Varshney et al. |
| 5,294,674 | A  | 3/1994  | Varshney et al. |
| 5,591,816 | A  | 1/1997  | Varshney et al. |
| 5,668,231 | A  | 9/1997  | Varshney et al. |
| 6,159,978 | A  | 12/2000 | Myers et al.    |
| 6,180,632 | B1 | 1/2001  | Myers et al.    |
| 6,245,760 | B1 | 6/2001  | He et al.       |
| 6,329,480 | B1 | 12/2001 | Uchiumi et al.  |
| 6,372,341 | B1 | 4/2002  | Jung et al.     |
| 6,524,347 | B1 | 2/2003  | Myers et al.    |
| 6,528,526 | B1 | 3/2003  | Myers et al.    |
| 2001/0023250 | A1 | 9/2001  | Spada et al.   |
| 2001/0027245 | A1* | 10/2001 | Moroishi ................... C08F 6/02 528/480 |
| 2002/0032290 | A1 | 3/2002  | Uchiumi et al. |
| 2003/0069377 | A1 | 4/2003  | Kobayashi      |
| 2003/0130285 | A1 | 7/2003  | Myers et al.   |
| 2003/0139399 | A1 | 7/2003  | Myers et al.   |
| 2003/0139400 | A1 | 7/2003  | Myers et al.   |
| 2003/0144284 | A1 | 7/2003  | Myers et al.   |
| 2004/0034183 | A1 | 2/2004  | Kato et al.    |
| 2004/0122161 | A1 | 6/2004  | Paul et al.    |
| 2005/0182054 | A1 | 8/2005  | Myers et al.   |
| 2005/0228135 | A1 | 10/2005 | Paul et al.    |

(Continued)

FOREIGN PATENT DOCUMENTS

| CN | 1732194 A | 2/2006 |
| CN | 1989216 A | 6/2007 |

(Continued)

OTHER PUBLICATIONS

Combined Office Action and Search Report dated Jan. 5, 2017 in Chinese Patent Application No. 201480058450.4 (with English translation of categories of cited documents).
International Search Report dated Jan. 13, 2015, in PCT/JP2014/077777 Filed Oct. 20, 2014.
Moineau, et al., "Synthesis of fully acrylic thermoplastic elastomers by atom transfer radical polymerization (ATRP), 2", Macromolecular Chemistry and Physics, 2000, vol. 201 (4 pages).
Grulke, "Solubility Parameter Values," Polymer Handbook Fourth Edition, VII, 1999 (21 pages).
Fedors, "A Method for Estimating Both the Solubility Parameters and Molar Volumes of Liquids," Polymer Engineering and Science, Feb. 1974, vol. 14, No. 2 (8 pages).
Extended European Search Report dated Dec. 12, 2016 in Patent Application No. 14856492.5.
Combined Chinese Office Action and Search Report dated Sep. 27, 2017 in Patent Application No. 201480058450.4 (with English translation of Categories of Cited Documents).
George Odian, "Principles of Polymerization" China Machine Press, Chinese Version—the 4th Edition, Apr. 2013, p. 255-256 and cover pages (with English translation).

(Continued)

*Primary Examiner* — Jeffrey C Mullis
(74) *Attorney, Agent, or Firm* — Oblon, McClelland, Maier & Neustadt, L.L.P.

(57) ABSTRACT

Provided are an adhesive composition suitable for a hot-melt adhesive which has a low tack and which after adhering to an adherend and through heat treatment comes to have sufficient adhesive force; and an adhesive product using the adhesive composition. The hot-melt adhesive composition includes an acrylic block copolymer (I) having at least one polymer block (A) including methacrylic acid ester units and at least one polymer block (B) including acrylic acid ester units, wherein the acrylic acid ester units constituting the polymer block (B) contain an acrylic acid ester (1) represented by $CH_2=CH-COOR^1$ (1) (wherein $R^1$ is an organic group having 1 to 3 carbon atoms) and an acrylic acid ester (2) represented by $CH_2=CH-COOR^2$ (2) (wherein $R^2$ is an organic group having 4 to 12 carbon atoms), and a mass ratio (1)/(2) of the acrylic acid ester (1) to the acrylic acid ester (2) is 90/10 to 25/75.

15 Claims, No Drawings

(56) References Cited

U.S. PATENT DOCUMENTS

| | | |
|---|---|---|
| 2006/0024521 A1 | 2/2006 | Everaerts et al. |
| 2006/0074210 A1* | 4/2006 | Simal ................ C08F 293/005 526/319 |
| 2006/0084755 A1 | 4/2006 | Good et al. |
| 2008/0269404 A1 | 10/2008 | Paul et al. |
| 2011/0034623 A1 | 2/2011 | Balk et al. |

FOREIGN PATENT DOCUMENTS

| | | |
|---|---|---|
| EP | 1 132 410 A1 | 9/2001 |
| EP | 1 258 519 A1 | 11/2002 |
| EP | 1 329 466 A1 | 7/2003 |
| EP | 1 433 799 A2 | 6/2004 |
| JP | 5-507737 A | 11/1993 |
| JP | 6-93060 A | 4/1994 |
| JP | 9-324165 A | 12/1997 |
| JP | 11-335432 A | 12/1999 |
| JP | 2000-119619 A | 4/2000 |
| JP | 2001-200026 A | 7/2001 |
| JP | 2002-513164 A | 5/2002 |
| JP | 2003-105300 A | 4/2003 |
| JP | 2004-204231 A | 7/2004 |
| JP | 2006-511640 A | 4/2006 |
| JP | 2006-117932 A | 5/2006 |
| JP | 2009-256497 A | 11/2009 |
| JP | 2010-536969 A | 12/2010 |
| JP | 2012-207155 A | 10/2012 |
| JP | 2013-163821 A | 8/2013 |

* cited by examiner

HOT-MELT ADHESIVE COMPOSITION

TECHNICAL FIELD

The present invention relates to an adhesive composition suitable for a hot-melt adhesive.

BACKGROUND ART

Adhesive products, such as adhesive sheets, adhesive films and adhesive tapes, are used in a wide variety of applications. As adhesives of an adhesive layer of the adhesive products, conventionally, solution-type adhesives in which a rubber or an acrylic polymer is dissolved in a solvent have been frequently used. Recently, from the viewpoints such as the reduction in VOC emission amount and the need to improve the workability at the adhesive production site, it has been studied to replace these solution-type adhesives with hot-melt adhesives. Patent literature 1, for example, studies hot-melt adhesives in which an acrylic block copolymer is used as a base material. Patent literature 2 studies articles having a hot-melt adhesive layer containing an acrylic block copolymer. Patent literature 3 studies adhesives that contain a branched acrylic block copolymer and are useable also as hot-melt adhesives. Patent literature 4 studies reactive hot-melt adhesives containing an acrylic block copolymer which are for example aimed at having improved properties.

When an adhesive product (e.g., adhesive sheet, adhesive film) having a hot-melt adhesive layer adheres to an adherend, the adhesive product in some cases needs to be easily re-attachable, for example, in order to be positioned accurately. To make the adhesive product easily re-attachable, it would be necessary that the adhesive layer has a low tack. And yet, in a hot-melt adhesive containing an acrylic polymer, the adhesive layer having a lower tack would have insufficient adhesive force to an adherend. Thus, it has been difficult for both a low tack and a high adhesive force to be achieved. Meanwhile, when adhesive sheets (films) are transported to the place they will be used, it has been common for the sheet (film) to be wound around a roll and for the rolled sheet (film) to be transported in view of facilitating the transportation. At this time, a protective film layer is provided on an adhesive layer disposed on a base material, but will be a waste once the adhesive product is used. If it is possible for the rolled adhesive sheet (film) with no protective film layers to be transported, this would be desirable. And yet, since conventional acrylic polymer-containing hot-melt adhesives have a relatively high tack, providing no protective film layers can cause the adhesive layer to adhere to the back side of the base material during the transportation, making the use of an adhesive product impossible.

CITATION LIST

Patent Literature

[Patent literature 1] JP-A-2004-204231
[Patent literature 2] JP-A-2002-513164
[Patent literature 3] JP-A-2006-511640
[Patent literature 4] JP-A-2006-117932
[Patent literature 5] JP-A-H06-93060
[Patent literature 6] JP-A-H05-507737
[Patent literature 7] JP-A-H11-335432

Non Patent Literature

[Non Patent Literature 1] "Macromolecular Chemistry and Physics", 2000, vol. 201, pp. 1108-1114

SUMMARY OF INVENTION

Technical Problem

It is thus an object of the present invention to provide an adhesive composition suitable for a hot-melt adhesive which has a low initial tack and which after adhering to an adherend and through heat treatment comes to have sufficient adhesive force; and an adhesive product using the adhesive composition.

Solution to Problem

According to the present invention, the above object is achieved by providing the following.

[1] A hot-melt adhesive composition comprising an acrylic block copolymer (I) having at least one polymer block (A) comprising methacrylic acid ester units and at least one polymer block (B) comprising acrylic acid ester units, wherein the acrylic acid ester units of the polymer block (B) are prepared from an acrylic acid ester (1) represented by the general formula $CH_2=CH-COOR^1$ (1) (wherein $R^1$ is an organic group having 1 to 3 carbon atoms) and an acrylic acid ester (2) represented by the general formula $CH_2=CH-COOR^2$ (2) (wherein $R^2$ is an organic group having 4 to 12 carbon atoms), and a mass ratio (1)/(2) of the acrylic acid ester (1) to the acrylic acid ester (2) is 90/10 to 25/75.

[2] The hot-melt adhesive composition described in the [1], wherein the polymer block (B) in the acrylic block copolymer (I) has a glass transition temperature of −30 to 30° C., and the polymer block (A) in the acrylic block copolymer (I) has a glass transition temperature of 80 to 140° C.

[3] The hot-melt adhesive composition described in the [1] or [2], wherein the acrylic block copolymer (I) has at least one peak temperature of tan δ (loss shear modulus/storage shear modulus) present in the range of from −20 to 40° C., the tan δ being determined from dynamic viscoelasticity in torsional vibration.

[4] The hot-melt adhesive composition described in any one of the [1] to [3], wherein the acrylic block copolymer (I) has a complex viscosity at 130° C. of not more than 15,000 Pa·s as measured with a dynamic viscoelasticity measuring instrument (torsion type).

[5] The hot-melt adhesive composition described in any one of the [1] to [4], wherein the acrylic block copolymer (I) has a weight-average molecular weight (Mw) of 30,000 to 300,000.

[6] The hot-melt adhesive composition described in any one of the [1] to [5], wherein the acrylic acid ester (1) is methyl acrylate.

[7] The hot-melt adhesive composition described in any one of the [1] to [6], wherein the acrylic acid ester (2) is n-butyl acrylate or 2-ethylhexyl acrylate.

[8] The hot-melt adhesive composition described in any one of the [1] to [7], which is subjected to thermosensitive adhesion processing or hot-melt coating processing at a temperature not higher than 140° C.

[9] The hot-melt adhesive composition described in any one of the [1] to [8], wherein a content of the acrylic block copolymer (I) is not less than 40% by mass relative to a total amount of solid contents of the hot-melt adhesive composition.

[10] A laminate obtained by laminating a layer comprising the hot-melt adhesive composition described in any one of the [1] to [9] with at least one base layer.

[11] A label having the laminate described in the [10].

[12] A thermosensitive adhesive sheet having a layer comprising the hot-melt adhesive composition described in any one of the [1] to [9].

Advantageous Effects of Invention

The hot-melt adhesive composition of the present invention is an adhesive composition suitable for a hot-melt adhesive. The adhesive comprising that hot-melt adhesive composition, which has low initial tack, is easily re-attachable, and through heat treatment comes to have increased adhesive force, thus being able to solidly adhere to an adherend. The hot-melt adhesive composition of the present invention, which has a low melt viscosity, is hot-melt adherable by hot melt coating at low temperature and by heat treatment at low temperature. Further, an adhesive product in which an adhesive layer composed of that hot-melt adhesive composition is provided on a base material can be provided in the form of a roll without the need to protect an outer surface of the adhesive layer with a protecting film or the like, and therefore is excellent in handleability.

DESCRIPTION OF EMBODIMENTS

The present invention is described below in detail. In the present invention, "(meth)acrylic acid ester" is a general term of "methacrylic acid ester" and "acrylic acid ester", and "(meth)acrylic" is a general term of "methacrylic" and "acrylic".

The acrylic block copolymer (I) used in the present invention has at least one polymer block (A) comprising methacrylic acid ester units and at least one polymer block (B) comprising acrylic acid ester units, wherein the acrylic acid ester units of the polymer block (B) are prepared from an acrylic acid ester (1) represented by the general formula $CH_2=CH-COOR^1$ (1) (wherein $R^1$ is an organic group having 1 to 3 carbon atoms) (simply referred to as the "acrylic acid ester (1)" hereinafter) and an acrylic acid ester (2) represented by the general formula $CH_2=CH-COOR^2$ (2) (wherein $R^2$ is an organic group having 4 to 12 carbon atoms) (simply referred to as "the acrylic acid ester (2)" hereinafter), and a mass ratio (1)/(2) of the acrylic acid ester (1) to the acrylic acid ester (2) is 90/10 to 25/75.

Examples of the methacrylic acid esters that are constitutional units of the polymer block (A) include methacrylic acid esters having no functional groups, such as methyl methacrylate, ethyl methacrylate, isopropyl methacrylate, n-propylmethacrylate, n-butylmethacrylate, isobutylmethacrylate, sec-butyl methacrylate, tert-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate and benzyl methacrylate; and methacrylic acid esters having a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate and tetrahydrofurfuryl methacrylate.

Of these, from the viewpoint of improving heat resistance and durability of the resulting hot-melt adhesive composition, preferable are methacrylic acid esters having no functional groups; and more preferable are methyl methacrylate, ethyl methacrylate, tert-butyl methacrylate, cyclohexyl methacrylate, isobornyl methacrylate and phenyl methacrylate. From the viewpoint of making the phase separation more definite between the polymer block (A) and the polymer block (B) thereby increasing the cohesive force of the hot-melt adhesive composition, further preferred is methyl methacrylate. The polymer block (A) may be composed of one of these methacrylic acid esters, or may be composed of two or more of them. The acrylic block copolymer (I) preferably contains two or more polymer blocks (A) from the viewpoint of increase in durability; in this case, those polymer blocks (A) may be the same or different.

The weight-average molecular weight (Mw) of the polymer block (A) is not specifically restricted, but it is preferably in the range of 1,000 to 50,000, and more preferably 4,000 to 20,000. If the weight-average molecular weight (Mw) of the polymer block (A) is less than the lower limit of the above range, the cohesive force of the resulting acrylic block copolymer (I) is insufficient in some cases. If the weight-average molecular weight (Mw) of the polymer block (A) is more than the upper limit of the above range, melt viscosity of the resulting acrylic block copolymer (I) is increased, and productivity of the acrylic block copolymer (I) or moldability in producing the adhesive composition is deteriorated, in some cases. The weight-average molecular weight (Mw) as used herein is a weight-average molecular weight in terms of standard polystyrene as determined by gel permeation chromatography (GPC). The proportion of the methacrylic acid ester units contained in the polymer block (A) is preferably not less than 60% by mass, more preferably not less than 80% by mass, still more preferably not less than 90% by mass, in the polymer block (A).

The polymer block (A) has a glass transition temperature (Tg) which is preferably 80 to 140° C., more preferably 100 to 140° C., and still more preferably 120 to 140° C. By the glass transition temperature being in the above range, when the adhesive is used at its ordinary use temperature, the polymer block (A) acts as a physical pseudo-crosslinking site, which allows the hot-melt adhesive to exhibit cohesive force and to have excellent adhesion properties, durability and heat resistance. The glass transition temperature is a temperature at which extrapolation of a curve obtained by DSC is started.

The acrylic acid ester units of the polymer block (B) are prepared from the acrylic acid ester (1) and the acrylic acid ester (2).

Examples of the acrylic acid ester (1) include acrylic acid esters having no functional groups, such as methyl acrylate, ethyl acrylate, isopropyl acrylate and n-propyl acrylate; and acrylic acid esters having a functional group, such as methoxyethyl acrylate, 2-hydroxyethyl acrylate, 2-aminoethyl acrylate and glycidyl acrylate.

Of these, from the viewpoint of reducing the initial tack of an adhesive comprising the resulting hot-melt adhesive composition, preferable are acrylic acid esters having no functional groups; more preferable are methyl acrylate and ethyl acrylate; and still more preferable is methyl acrylate. These may be used singly, or may be used in combination of two or more kinds.

Examples of the acrylic acid ester (2) include acrylic acid esters having no functional groups, such as n-butyl acrylate, isobutyl acrylate, sec-butyl acrylate, tert-butyl acrylate, amyl acrylate, isoamyl acrylate, n-hexyl acrylate, 2-ethylhexyl acrylate, n-octyl acrylate, isooctyl acrylate, decyl acrylate, isobornyl acrylate, lauryl acrylate, cyclohexyl acrylate, phenyl acrylate and benzyl acrylate; and acrylic acid esters having a functional group, such as ethoxyethyl acrylate, diethylaminoethyl acrylate, tetrahydrofurfuryl acrylate and phenoxyethyl acrylate.

Of these, from the viewpoint of allowing the resulting hot-melt adhesive composition to have increased adhesive force after heat treatment and making the phase separation more definite between the polymer block (A) and the polymer block (B) thereby allowing the hot-melt adhesive composition to exhibit a high cohesive force, preferable are acrylic acid esters having no functional groups, such as n-butyl acrylate and 2-ethylhexyl acrylate. From the viewpoint that the resulting hot-melt adhesive composition has excellent adhesion properties (e.g., tack, adhesive force) at low temperature (10 to −40° C.) and exhibits adhesive force stable under a wide range of peeling rate conditions, more preferable is n-butyl acrylate. These may be used singly, or may be used in combination of two or more kinds.

In the polymer block (B), the mass ratio (1)/(2) of the acrylic acid ester (1) to the acrylic acid ester (2) is 90/10 to 25/75. When the mass ratio is in the above range, excellent balance is achieved between the effects of lowering initial tack, lowering viscosity and anchoring effect that are attributed to the acrylic acid ester (1) and the wettability that is attributed to the acrylic acid ester (2). Therefore, it can be achieved both to lower the initial tack and to increase the adhesive force after heat treatment. When the mass ratio (1)/(2) of the acrylic acid ester (1) to the acrylic acid ester (2) is in the above range, the polymer block (B) has a storage modulus at room temperature (about 25° C.) as measured with a dynamic viscoelasticity measuring instrument (torsion type) of not less than 1,000,000 Pa, and a storage modulus at 130° C. as measured therewith of not more than 15,000 Pa: tack-free at room temperature and high adhesive force after heat treatment. In view of the above, the mass ratio (1)/(2) of the acrylic acid ester is preferably 80/20 to 37/63, and more preferably 70/30 to 42/58. The mass ratio of the acrylic acid ester (1) to the acrylic acid ester (2) can be measured by 1H-NMR.

The upper limit of the proportion of the acrylic acid ester (1) in the polymer block (B) is preferably 90%, more preferably 80%, and still more preferably 70%. The lower limit of the proportion of the acrylic acid ester (1) in the polymer block (B) is preferably 25%, more preferably 37%, and still more preferably 42%.

Examples of combinations of the acrylic acid esters used for the polymer block (B) include methyl acrylate/n-butylacrylate, methyl acrylate/2-ethylhexyl acrylate, methyl acrylate/n-butyl acrylate/2-ethylhexyl acrylate, ethyl acrylate/n-butyl acrylate, and ethyl acrylate/2-ethylhexyl acrylate. The acrylic acid ester (1) and the acrylic acid ester (2) used herein are more preferably an acrylic acid ester (1) and an acrylic acid ester (2) having a difference in solubility parameter between them ranging from 1.0 to 2.5 $(MPa)^{1/2}$. The solubility parameter can be calculated by the method described in "POLYMER HANDBOOK Fourth Edition", VII, pp. 675-714 (Wiley Interscience, ed. issued in 1999) and "Polymer Engineering and Science", 1974, vol. 14, pp. 147-154. When two or more polymer blocks (B) are contained in the acrylic block copolymer (I), combinations of the acrylic acid ester units constituting the polymer blocks (B) may be the same or different.

The polymer block (B) may be composed of a random copolymer of the acrylic acid ester (1) and the acrylic acid ester (2) that constitute the polymer block (B), or may be composed of a block copolymer of the acrylic acid esters, or may be composed of a tapered block copolymer (gradient copolymer) of the acrylic acid esters. When two or more polymer blocks (B) are contained in the acrylic block copolymer (I), the structures of those polymer blocks (B) may be the same or different. The proportion of the total of the acrylic acid ester units (1) and (2) contained in the polymer block (B) is preferably not less than 60% by mass, more preferably not less than 80% by mass, and still more preferably not less than 90% by mass, in the polymer block (B).

The polymer block (B) has a glass transition temperature (Tg) which is preferably −30 to 30° C., more preferably −10 to 30° C., still more preferably 0 to 30° C., and most preferably 10 to 30° C. When the glass transition temperature is in the above range, the resultant hot-melt adhesive can have appropriate tack and adhesive force. Further, the resultant hot-melt adhesive has low adhesive force and tack at room temperature, and through heat treatment exhibits adhesive force. By containing the acrylic acid ester (1), which has a relatively high Tg (about −40 to +20° C.), and the acrylic acid ester (2), which has a relatively low Tg (about −80 to −40° C.), at a specific ratio, the acrylic block copolymer (I) has increased modulus at room temperature, which is presumed to be the reason for the inhibited tack at room temperature.

The acrylic block copolymer (I) of the present invention preferably has at least one peak temperature of tan δ (loss shear modulus/storage shear modulus) present in the range of from −20° C. to 40° C., the tan δ being determined from dynamic viscoelasticity in torsional vibration. The peak temperature of the tan δ in the above temperature range is attributed to the polymer block (B) contained in the acrylic block copolymer (I). When the peak temperature of the tan δ is in the above range, the resultant hot-melt adhesive can have appropriate tack and adhesive force. From the viewpoint of giving more appropriate tack and adhesive force, the peak temperature of the tan δ more preferably falls in the range of from 0 to 40° C., still more preferably in the range of from 10 to 40° C., and most preferably in the range of from 20 to 40° C.

In the polymer block (A) and the polymer block (B), components of one block may be contained in the other block within limits not detrimental to the effect of the present invention. Further, other monomers may be contained, if necessary. Examples of such other monomers include vinyl-based monomers having a carboxyl group, such as (meth)acrylic acid, crotonic acid, maleic acid, maleic anhydride, fumaric acid and (meth)acrylamide; vinyl-based monomers having a functional group, such as (meth)acrylonitrile, vinyl acetate, vinyl chloride and vinylidene chloride; aromatic vinyl-based monomers, such as styrene, α-methylstyrene, p-methylstyrene and m-methylstyrene; conjugated diene-based monomers, such as butadiene and isoprene; olefin-based monomers, such as ethylene, propylene, isobutene and octene; and lactone-based monomers, such as ε-caprolactone and valerolactone. When these monomers are used, they are preferably used in an amount of not more than 40% by mass, and more preferably not more than 20% by mass, based on the total mass of the monomers used for the individual polymer blocks.

The acrylic block copolymer (I) used in the present invention may have other polymer blocks in addition to the polymer block (A) and the polymer block (B), if necessary. Examples of other polymer blocks include polymer blocks or copolymer blocks prepared from any of styrene, α-methylstyrene, p-methylstyrene, m-methylstyrene, acrylonitrile, methacrylonitrile, ethylene, propylene, isobutene, butadiene, isoprene, octene, vinyl acetate, maleic anhydride, vinyl chloride and vinylidene chloride; and polymer blocks composed any of polyethylene terephthalate, polylactic acid, polyurethane and polydimethylsiloxane. In the polymer blocks, hydrogenation products of polymer blocks containing conjugated diene compounds such as butadiene and isoprene are also included.

When the polymer block (A) is designated by "A" and the polymer block (B) is designated by "B", the acrylic block copolymer (I) is preferably represented by any of the general formulas:

(A-B)n (A-B)n-A

B-(A-B)n (A-B)n-Z (B-A)n-Z wherein n represents an integer of 1 to 30, and Z represents a coupling site (coupling site after coupling agent reacts with polymer end to form chemical bond). The value of n is preferably 1 to 15, more preferably 1 to 8, still more preferably 1 to 4. Of the copolymers of the above structures, a linear block copolymer represented by (A-B)n, (A-B)n-A or B-(A-B)n is preferable.

The weight-average molecular weight (Mw) of the whole of the acrylic block copolymer (I) used in the present invention is preferably 30,000 to 300,000. In particular, when the hot-melt adhesive composition of the present invention is used by being thermally molten through hot-melt coating method, T-die method, inflation method, calendering method, lamination method or the like, the Mw is more preferably 30,000 to 200,000 from the viewpoint of productivity in coating or in film processing. From the viewpoint that the viscosity behavior in extrusion or the like is stable and from the viewpoint that the hot-melt adhesive composition has low viscosity and excellent coating properties in the hot-melt coating process, the weight-average molecular weight (Mw) is more preferably 35,000 to 180,000, and particularly preferably 40,000 to 150,000.

The ratio (Mw/Mn) of the weight-average molecular weight (Mw) of the whole of the acrylic block copolymer (I) used in the present invention to the number-average molecular weight (Mn) thereof is 1.0 to 1.5. From the viewpoint that the cohesive force of the resulting hot-melt adhesive composition at high temperature is high, the ratio is preferably 1.0 to 1.4, and more preferably 1.0 to 1.3.

The acrylic block copolymer (I) used in the present invention preferably has a complex viscosity at 130° C. of not more than 15,000 Pa·s, as measured with a dynamic viscoelasticity measuring instrument (torsion type). When the complex viscosity is not more than 15,000 Pa·s, the adhesive composition can be heat-molten at a relatively low temperature not higher than 140° C., preferably not higher than 130° C., for e.g., hot-melt coating and thermal adhering (thermal lamination). From the viewpoint of ensuring good hot-melt coatability, the acrylic block copolymer (I) has a complex viscosity at 130° C. which is more preferably not more than 10,000 Pa·s.

The acrylic block copolymer (I) used in the present invention preferably has a storage modulus G'(Pa) at 130° C., as measured with a dynamic viscoelasticity measuring instrument (torsion type), whose common logarithm to base 10 (log G') is preferably not more than 4.3. When this value is not more than 4.3, the adhesive composition can be heat-molten at a relatively low temperature not higher than 130° C., for e.g., hot-melt coating and thermal adhering (thermal lamination). From the viewpoint of ensuring good hot-melt coatability, the acrylic block copolymer (I) has log G' at 130° C. which is more preferably not more than 4.1.

The content of the polymer block (A) in the acrylic block copolymer (I) used in the present invention is preferably 5 to 95% by mass, and the content of the polymer block (B) therein is preferably 95 to 5% by mass. From the viewpoint of providing the hot-melt adhesive composition with superior performance, it is preferable that the content of the polymer block (A) is 15 to 60% by mass and the content of the polymer block (B) is 85 to 40% by mass; it is more preferable that the content of the polymer block (A) is 18 to 60% by mass and the content of the polymer block (B) is 82 to 40% by mass; it is still more preferable that the content of the polymer block (A) is 22 to 50% by mass and the content of the polymer block (B) is 78 to 50% by mass; and it is particularly preferable that the content of the polymer block (A) is 25 to 40% by mass and the content of the polymer block (B) is 75 to 60% by mass. When the content of the polymer block (B) is 85 to 40% by mass, there is an advantage that whitening rarely occurs after storage under wet heat conditions.

A process for producing the acrylic block copolymer (I) used in the present invention is not specifically restricted as long as polymers satisfying the requirements of the present invention are obtained, and processes based on publicly known techniques are adoptable. A process for obtaining a block copolymer having a narrow molecular weight distribution that is generally adopted is a process comprising living-polymerizing monomers that are constitutional units. Examples of such a process comprising living polymerization include a process wherein living polymerization is performed using an organic rare earth metal complex as a polymerization initiator (see patent literature 5); a process wherein living anionic polymerization is performed using an organic alkaline metal compound as a polymerization initiator in the presence of a mineral acid salt such as a salt of an alkaline metal or an alkaline earth metal (see patent literature 6); a process wherein living anionic polymerization is performed using an organic alkaline metal compound as a polymerization initiator in the presence of an organoaluminum compound (see patent literature 7); and an atomic transfer radical polymerization process (ATRP) (see non patent literature 1).

Among the above production processes, it is preferred to adopt the process wherein living anionic polymerization is performed using an organic alkaline metal compound as a polymerization initiator in the presence of an organoaluminum compound, in that the resulting block copolymer has high transparency, with residual monomers in small amount and the odor inhibited, and in use as a hot-melt adhesive composition, occurrence of bubbles after lamination can be inhibited. Such a process is preferable also from the viewpoints that the molecular structure of the methacrylic acid ester polymer block becomes highly syndiotactic, and this contributes to enhancement of heat resistance of the hot-melt adhesive composition The organoaluminum compound is, for example, an organoaluminum compound represented by the following general formula (3):

$$AlR^3R^4R^5 \qquad (3)$$

wherein $R^3$, $R^4$ and $R^5$ are each independently an alkyl group which may have a substituent, a cycloalkyl group which may have a substituent, an aryl group which may have a substituent, an aralkyl group which may have a substituent, an alkoxyl group which may have a substituent, an aryloxy group which may have a substituent or an N,N-disubstituted amino group; or $R^3$ is any one group of the above groups, and $R^4$ and $R^5$ together form an arylenedioxy group which may have a substituent.

Preferred as the organoaluminum compounds represented by the general formula (3) from the viewpoints of high living properties in the polymerization, easy handlability and the like are isobutylbis(2,6-di-tert-butyl-4-methylphenoxy)aluminum, isobutylbis(2, 6-di-tert-butylphenoxy)aluminum, isobutyl[2,2'-methylenebis(4-methyl-6-tert-butylphenoxy)] aluminum, etc.

Examples of the organic alkaline metal compounds include alkyllithiums and alkyldilithiums, such as n-butyllithium, sec-butyllithium, isobutyllithium, tert-butyllithium, n-pentyllithium and tetramethylenedilithium; aryllithiums and aryldilithiums, such as phenyllithium, p-tolyllithium and lithium naphthalene; aralkyllithiums and aralkyldilithiums, such as benzyllithium, diphenylmethyllithium and dilithium formed by the reaction of diisopropenylbenzene with butyllithium; lithium amides, such as lithium dimethylamide; and lithium alkoxides, such as methoxylithium and ethoxylithium. These may be used singly, or may be used in combination of two or more kinds. From the viewpoint of high polymerization initiation efficiency, alkyllithiums are preferable among them, and of these, tert-butyllithium and sec-butyllithium are more preferable, and sec-butyllithium is still more preferable.

The living anionic polymerization is usually carried out in the presence of a solvent inert to the polymerization reaction. Examples of the solvent include aromatic hydrocarbons, such as benzene, toluene and xylene; halogenated hydrocarbons, such as chloroform, methylene chloride and carbon tetrachloride; and ethers, such as tetrahydrofuran and diethyl ether.

The acrylic block copolymer (I) can be produced by, for example, repeating a step of forming a desired polymer block (polymer block (A), polymer block (B) or the like) at an end of a desired living polymer obtained by polymerizing a monomer, a desired number of times, and then terminating the polymerization reaction. Specifically, the acrylic block copolymer (I) can be produced by, for example, carrying out plural polymerization steps including a first step of polymerizing a monomer to form a first polymer block, a second step of polymerizing a monomer to form a second polymer block, and if necessary, a third step of polymerizing a monomer to form a third polymer block, said each step being carried out using a polymerization initiator comprising an organic alkaline metal compound in the presence of an organoaluminum compound, and then allowing the active end of the resulting polymer to react with an alcohol or the like to terminate the polymerization reaction. According to such a process as above, a block bipolymer (diblock copolymer) consisting of polymer block (A)-polymer block (B), a block terpolymer (triblock copolymer) consisting of polymer block (A)-polymer block (B)-polymer block (A), a block quaterpolymer consisting of polymer block (A)-polymer block (B)-polymer block (A)-polymer block (B), etc. can be produced.

In the formation of the polymer block (A), the polymerization temperature is preferably 0 to 100° C., and in the formation of the polymer block (B), the polymerization temperature is preferably −50 to 50° C. If the polymerization temperature is lower than the lower limit of the above range, the reaction progresses slowly, and a long time is required for completion of the reaction. On the other hand, if the polymerization temperature is higher than the upper limit of the above range, deactivation of the living polymer end is increased, and as a result, the molecular weight distribution is widened or a desired block copolymer is not obtained. The polymer block (A) and the polymer block (B) can be each formed by polymerization in 1 second to 20 hours.

The hot-melt adhesive composition of the present invention comprises the acrylic block copolymer (I). As long as the effect of the present invention is achieved, the content of the acrylic block copolymer contained in the hot-melt composition is not particularly restricted, but the content of the acrylic block copolymer (I), with respect to the total amount of solid contents of the hot-melt adhesive composition, is preferably not less than 40% by mass, more preferably not less than 50% by mass, still more preferably not less than 60% by mass, and most preferably not less than 80% by mass. By not less than 40% by mass of the acrylic block copolymer being contained in the hot-melt adhesive composition, properties of hot-melt adhesive of the present invention are exhibited more easily.

In the hot-melt adhesive composition of the present invention, other polymers and additives, such as tackifying resin, softener, plasticizer, heat stabilizer, light stabilizer, antistatic agent, flame retardant, blowing agent, colorant, dye, refractive index adjusting agent, filler and curing agent, may be contained. These other polymers and additives may be contained singly, or may be contained in combination of two or more kinds.

Examples of said other polymers include acrylic resins, such as poly(methyl methacrylate) and (meth)acrylic acid ester copolymers; olefin-based resins, such as polyethylene, ethylene/vinyl acetate copolymer, polypropylene, polybutene-1, poly-4-methylpentene-1 and polynorbornene; ethylene-based ionomers; styrene-based resins, such as polystyrene, styrene/maleic anhydride copolymer, high impact polystyrene, AS resin, ABS resin, AES resin, AAS resin, ACS resin and MBS resin; styrene/methyl methacrylate copolymer; polyester resins, such as polyethylene terephthalate, polybutylene terephthalate and polylactic acid; polyamides, such as nylon 6, nylon 66 and polyamide elastomer; polycarbonate; polyvinyl chloride; polyvinylidene chloride; polyvinyl alcohol; ethylene/vinyl alcohol copolymer; polyacetal; polvinylidene fluoride; polyurethane; modified polyphenylene ether; polyphenylene sulfide; silicone rubber modified resins; acrylic rubbers; silicone-based rubbers; styrene-based thermoplastic elastomers, such as SEPS, SEBS and SIS; and olefin-based rubbers, such as IR, EPR and EPDM. Of these, acrylic resins, ethylene/vinyl acetate copolymer, AS resin, polylactic acid and polyvinylidene fluoride are preferable, and (meth)acrylic acid ester copolymers are more preferable, from the viewpoint of compatibility with the acrylic blockcopolymer (I) contained in the hot-melt adhesive composition.

The above (meth)acrylic acid ester copolymers are preferably a diblock copolymer and a triblock copolymer, each of which is composed of at least one polymer block comprising methacrylic acid ester units and at least one polymer block comprising acrylic acid ester units (These diblock copolymers and triblock copolymers do not include the acrylic block copolymer (I) of the present invention).

If the hot-melt adhesive composition of the present invention contains a tackifying resin, it would be preferred because this makes it easy to control tack, adhesive force and holding power. Examples of the tackifying resin include natural resins, such as rosin-based resins and terpene-based resins; and synthetic resins, such as petroleum resins, hydrogen-added (sometimes referred to as "hydrogenated" hereinafter) petroleum resins, styrene-based resins, coumarone-indene-based resins, phenolic resins and xylene-based resins. When the tackifying resin is incorporated, the content thereof is preferably 1 to 100 parts by mass, more preferably 3 to 70 parts by mass, still more preferably 5 to 50 parts by mass, particularly preferably 5 to 40 parts by mass, and most preferably 5 to 35 parts by mass, with respect to 100 parts by mass of the acrylic block copolymer (I), from the viewpoints of adhesive force and durability.

Examples of the rosin-based resins include rosins, such as gum rosin, tall oil rosin and wood rosin; modified rosins, such as hydrogenated rosin, disproportionated rosin and polymerized rosin; and rosin esters, such as glycerol esters and pentaerythritol esters of these rosins and modified rosins. Specific examples of the rosins include Pinecrystal KE-100, Pinecrystal KE-311, Pinecrystal KE-359, Pinecrystal KE-604 and Pinecrystal D-6250 (each manufactured by Arakawa Chemical Industries, Ltd.)

Examples of the terpene-based resins include terpene resins having α-pinene, β-piene, dipentene or the like as a main body, aromatic modified terpene resins, hydrogenated terpene resins and terpene phenol resins. Specific examples of the terpene-based resins include Tamanol 901 (manufactured by Arakawa Chemical Industries, Ltd.). Examples of the (hydrogenated) petroleum resins include (hydrogenated) aliphatic ($C_5$ type) petroleum resins, (hydrogenated) aromatic ($C_9$ type) petroleum resins, (hydrogenated) copolymer-based ($C_5/C_9$ type) petroleum resins, (hydrogenated) dicyclopentadiene-based petroleum resins and alicyclic saturated hydrocarbon resins. Examples of the styrene-based resins include poly-α-methylstyrene, α-methylstyrene/styrene copolymer, styrene-based monomer/aliphatic monomer copolymer, styrene-based monomer/α-methylstyrene/aliphatic monomer copolymer, styrene-based monomer copolymer, and styrene-based monomer/aromatic monomer copolymer. Specific examples of the styrene-based resins include FTR6000 series and FTR7000 series (manufactured by Mitsui Chemicals, Inc.).

Of the above tackifying resins, rosin-based resins, terpene-based resins, (hydrogenated) petroleum resins and styrene-based resins are preferable from the viewpoint of appearance of high adhesive force, and of these, rosins are preferable from the viewpoint that adhesion properties are enhanced. From the viewpoints of resistance to photo-deterioration and inhibition of coloration and occurrence of bubbles caused by impurities, disproportionated or hydrogenated rosins having been purified by operations such as distillation, recrystallization and extraction are more preferable. These may be used singly, or may be used in combination of two or more kinds. The softening point of the tackifying resin is preferably 50 to 150° C. from the viewpoint of appearance of high adhesive force.

Examples of the plasticizers include fatty acid esters, e.g., phthalic acid esters, such as dibutyl phthalate, di-n-octyl phthalate, bis-2-ethylhexyl phthalate, di-n-decyl phthalate and diisodecyl phthalate, sebacic acid esters, such as bis-2-ethylhexyl sebacate and di-n-butyl sebacate, azelaic acid esters, such as bis-2-ethylhexyl azelate and adipic acid esters, such as bis-2-ethylhexyl adipate and di-n-octyl adipate; paraffins, such as chlorinated paraffin; glycols, such as polypropylene glycol; epoxy-based high-molecular plasticizers, such as epoxidized soybean oil and epoxidized linseed oil; phosphoric acid esters, such as trioctyl phosphate and triphenyl phosphate; phosphorous acid esters, such as triphenyl phosphite; acrylic oligomers, such as poly(n-butyl (meth)acrylate) and poly(2-ethylhexyl (meth)acrylate); polybutene; polyisobutylene; polyisoprene; process oil; and naphthenic oil. These may be used singly, or may be used in combination of two or more kinds.

Examples of the fillers include inorganic fibers and organic fibers, such as glass fiber and carbon fiber; and inorganic fillers, such as calcium carbonate, talc, carbon black, titanium oxide, silica, clay, barium sulfate and magnesium carbonate. When the inorganic fibers or the organic fibers are contained, durability is imparted to the resulting hot-melt adhesive composition. When the inorganic fillers are contained, heat resistance and weathering resistance are imparted to the resulting hot-melt adhesive composition.

When the hot-melt adhesive composition is used together with a curing agent, the composition can be preferably used as an UV curing type adhesive. As the curing agent, photo-curing agents such as UV curing agents, and thermal curing agents can be mentioned, and for example, benzoins, benzoin ethers, benzophenones, anthraquinones, benzyls, acetophenones and diacetyls can be mentioned. Specific examples thereof include benzoin, α-methylolbenzoin, α-t-butylbenzoin, benzoin methyl ether, benzoin ethyl ether, benzoin n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzyl, 2,2-dimethoxy-1,2-diphenylethane-1-one (2,2-dimethoxy-2-phenylacetophenone) and diacetyl. The curing agents may be used singly, or may be used in combination of two or more kinds. From the viewpoint of increase in effects of the curing agent, there may be further added, for example, monomers such as (meth)acrylic acid, (meth)acrylic acid esters, (meth)acrylamides, (meth)acrylamide derivatives, vinyl esters, vinyl ethers and styrene derivatives; and oligomers containing any of the above monomers as constituents. In addition to these monomers, crosslinking agents comprising bifunctional or higher functional monomers or oligomers may be further added.

A process for producing the hot-melt adhesive composition of the present invention is not specifically restricted. The composition can be produced by, for example, mixing the components using a known mixing or kneading device, such as a kneader-ruder, an extruder, a mixing roll or a Banbury mixer, usually at a temperature of 100° C. to 250° C. It is also possible that the hot-melt adhesive composition is produced by dissolving each component in an organic solvent, followed by mixing and by distilling the organic solvent. The resultant composition, by being heat melting, is useable as a hot-melt adhesive. In the case where each component of the hot-melt adhesive is dissolved in an organic solvent followed by mixing and by distilling the organic solvent in order to produce an adhesive, it is possible that the composition is applied on the adherend before the organic solvent is distilled, and then the distilling is followed by thermosensitive adhesion processing. In use by being thermally molten, the hot-melt adhesive composition of the present invention has a melt viscosity which is preferably low from the viewpoints of processability and handleability: for example the composition, when subjected to holt-melt processing, has a melt viscosity at about 200° C. which is preferably not more than 50,000 mPa·s, and more preferably not more than 30,000 mPa·s.

The hot-melt adhesive composition of the present invention thus obtained can be subjected to thermosensitive adhesion processing or hot-melt coating processing at a sufficiently low temperature, and preferably at a temperature not higher than 140° C., and more preferably at a temperature from 130 to 140° C.

The hot-melt adhesive composition of the present invention is favorably used for an adhesive layer composed of the hot-melt adhesive composition or an adhesive product in the form of a laminate containing the adhesive layer.

When the hot-melt adhesive composition of the present invention is thermally molten in order to form the adhesive layer, a method is adoptable such as hot-melt coating method, T-die method, inflation method, calendering method and lamination method, whereby the composition can be formed into a sheet, a film or the like.

The laminate is obtainable by laminating a layer (adhesive layer) composed of the hot-melt adhesive composition of the present invention onto any of various bases, such as paper, cellophane, plastic materials, cloth, wood and metals. Since the hot-melt adhesive composition of the present invention is excellent in transparency and weathering resistance, it is preferred to use a base layer composed of a transparent material in which case a transparent laminate is obtained. The base layer composed of a transparent material is composed of, for example but not limited to, a polymer such as polyethylene terephthalate, triacetyl cellulose, polyvinyl alcohol, cycloolefin-based resin, styrene/methyl methacrylate copolymer, polypropylene, polyethylene, ethylene/vinyl acetate copolymer, polycarbonate, poly(methyl methacrylate), polyethylene or polypropylene; a mixture of two or more of these polymers, glass or the like. The said polymer can be a copolymer copolymerized with various monomers.

Exemplary structures of the laminate include a two-layer structure consisting of an adhesive layer composed of the hot-melt adhesive composition of the present invention and a base layer; a three-layer structure consisting of two base layers and an adhesive layer composed of the hot-melt adhesive composition of the present invention (base layer/adhesive layer/base layer); a four-layer structure consisting of a base layer, two different adhesive layers (a) and (b) composed of the hot-melt adhesive compositions of the present invention and a base layer (base layer/adhesive layer (a)/adhesive layer (b)/base layer); a four-layer structure consisting of a base layer, an adhesive layer (a) composed of the hot-melt adhesive composition of the present invention, an adhesive layer (c) composed of another material and a base layer (base layer/adhesive layer (a)/adhesive layer (c)/base layer); and a five-layer structure consisting of three base layers and two adhesive layers composed of the hot-melt adhesive composition of the present invention (base layer/adhesive layer/base layer/adhesive layer/base layer), without limiting thereto.

Although a thickness ratio in the laminate is not specifically restricted, the thickness ratio (base layer/adhesive layer) is preferably in the range of 1/1000 to 1000/1, and more preferably 1/200 to 200/1, from the viewpoints of adhesion properties, durability and handleability of the resulting adhesive products.

In producing the laminate, an adhesive layer and a base layer separately formed may be laminated together by lamination method or the like; or an adhesive layer may be directly formed on a base layer; or an adhesive layer and a base layer may be co-extruded to form a layer structure at a time.

In order to increase adhesive force between the base layer and the adhesive layer in the laminate of the present invention, the surface of the base layer may be subjected to surface treatment such as corona discharge treatment or plasma discharge treatment in advance. Further, a surface of at least one of the adhesive layer and the base layer may be provided with an anchor layer using e.g., a resin with adhesion properties.

Examples of resins used for the anchor layer include an ethylene/vinyl acetate copolymer, an ionomer, a block copolymer (e.g., styrene-based triblock copolymer such as SIS or SBS, and diblock copolymer), an ethylene/acrylic acid copolymer and an ethylene/methacrylic acid copolymer. One anchor layer may be formed, or two or more anchor layers may be formed.

In the formation of the anchor layer, the method to form the anchor layer is not specifically restricted: examples thereof include a method wherein a solution containing the resin is applied onto the base layer to form the anchor layer; and a method wherein a composition containing the resin or the like giving the anchor layer is thermally molten, and using the melt, the anchor layer is formed on the base layer surface by means of a T-die or the like.

In the formation of the anchor layer, it is possible that the resin giving the anchor layer and the hot-melt adhesive composition of the present invention are co-extruded to integrally laminate the anchor layer and the adhesive layer on the base layer surface; that the resin giving the anchor layer and the hot-melt adhesive composition may be laminated in order on the base layer surface; and that if the base layer is a plastic material layer, the plastic material giving the base layer, the resin giving the anchor layer and the hot-melt adhesive composition may be co-extruded at a time.

The laminate having the adhesive layer and the base layer may be used as a thermosensitive adhesive sheet in which the adhesive layer is a thermosensitive adhesive layer.

The adhesive comprising the hot-melt adhesive composition of the present invention is useable in various applications. While the adhesive layer composed of the hot-melt adhesive composition can be used alone as an adhesive sheet, the laminate containing the adhesive layer is applicable to various uses. Those applications include adhesives and adhesive tapes or films for surface protection, masking, shoes, binding, packaging, office uses, labels, decoration/display, book binding, bonding, dicing tapes, sealing, corrosion prevention/waterproofing, medical/sanitary uses, prevention of glass scattering, electrical insulation, holding and fixing of electronic equipments, production of semiconductors, optical display films, adhesion type optical films, shielding from electromagnetic waves, and sealing materials of electric and electronic parts. Specific examples are given below.

The adhesives, the adhesive tapes or films, etc. for surface protection can be used for various materials, such as metals, plastics, rubbers and wood, and specifically, they can be used for surface protection of coating material surfaces, metals during deformation processing or deep drawing, and automobile parts or optical parts. Examples of the automobile parts include coated exterior plates, wheels, mirrors, windows, lights and light covers. Examples of the optical parts include various image display devices, such as liquid crystal display, organic EL display, plasma display and field emission display; optical disk constitutional films, such as polarizing film, polarizing plate, retardation plate, light guiding panel, diffusion plate and DVD; and fine coat faceplates for electronic/optical uses.

Exemplary uses of the adhesives, the tapes, the films, etc. for masking include masking in manufacturing of printed wiring boards or flexible printed wiring boards; masking in a plating or soldering treatment for electronic equipments; and masking in manufacturing of vehicles such as automobiles, in coating of vehicles and buildings, in textile printing, and in parting of civil engineering works.

Exemplary uses of the adhesives for shoes include adhesion between a shoe body (upper) and a shoe sole, a heel, an insole, decorative parts or the like, and adhesion between an outer sole and a midsole.

Exemplary uses for binding include binding of wire harnesses, electric wires, cables, fibers, pipes, coils, windings, steel materials, ducts, plastic bags, foods, vegetables and flowering plants. Exemplary uses for packaging include heavy material packaging, packaging for export, sealing of corrugated fiberboards and can sealing. Examples of office uses include general use for office, and uses for sealing, mending of books, drawing and memorizing. Exemplary uses for labels include price display, merchandise display, tags, POP, stickers, stripes, nameplates, decoration and advertisement.

Examples of the labels include labels having, as bases, e.g., papers such as paper, converted paper (paper having been subjected to aluminum deposition, aluminum laminating, vanishing, resin treatment or the like) and synthetic paper; films made of cellophane, plastic materials, cloth, wood, metals or the like. Specific examples of the bases include woodfree paper, art paper, cast-coated paper, thermal paper, foil paper, polyethylene terephthalate film, OPP film, polylactic acid film, synthetic paper, thermal synthetic paper and over laminate film. Among them, the hot-melt adhesive composition of the present invention, because of being excellent in transparency and weathering resistance, can be favorably used for labels using bases made of transparent materials. Further, the hot-melt adhesive composition of the present invention, because of little discoloration over time, can be favorably used for thermal labels having thermal paper or thermal synthetic paper as a base.

Examples of adherends for the labels include plastic products, such as plastic bottles and foamed plastic cases; paper or corrugated fiberboard products, such as corrugated fiberboard boxes; glass products, such as glass bottles; metal products; and other inorganic material products, such as ceramic products.

The label comprising a laminate containing an adhesive layer composed of the hot-melt adhesive composition of the present invention rarely suffers adhesion acceleration during storage at a temperature that is a little higher than room temperature (e.g., 60° C.), and is peelable without adhesive transfer after it is used. Moreover, it can be allowed to adhere to an adherend even at low temperatures (−40 to +10° C.), and even if it is stored at low temperatures (−40 to +10° C.), it does not come off.

Exemplary uses for decoration/display include danger display seals, line tapes, wiring markings, after-glow luminous adhesive tapes and reflecting sheets.

Examples of the adhesion-type optical films include optical films on at least a part or all of one or both surfaces of which, an adhesive layer has been formed, such as polarizing films, polarizing plates, retardation films, viewing angle enlarging films, luminance improving films, anti-reflection films, antiglare films, color filters, light guiding panels, diffusion films, prism sheets, electromagnetic wave shielding films, near infrared absorbing films, functional composite optical films, films for ITO lamination, impact resistance imparting films, and visibility improving films. The adhesion-type optical films include films in which an adhesive layer composed of the hot-melt adhesive composition of the present invention has been formed on a protective film used for protecting a surface of the above optical film. The adhesion-type optical films are favorably used in various image display devices, such as liquid crystal display devices, PDP, organic EL display devices, electronic paper, game machines and mobile terminals.

Exemplary uses for electrical insulation include protective covering or insulation of coils, and layer insulation such as motor/transformer layer insulation. Exemplary uses for holding and fixing of electrical equipments include carrier tapes, packaging, fixing of cathode ray tubes, splicing and rib reinforcement. Exemplary uses for production of semiconductors include protection of silicon wafers. Exemplary uses for bonding include bonding in various adhesive fields, automobiles, electric trains and electric equipments, fixing of printing plates, bonding for construction, fixing of nameplates, bonding in general homes, and bonding to rough surfaces, irregular surfaces and curved surfaces. Exemplary uses for sealing include sealing for heat insulation, vibration isolation, waterproofing, moisture proofing, sound insulation and dust proofing. Exemplary uses for corrosion prevention/waterproofing include corrosion prevention for gas pipes and water pipes, corrosion prevention for large diameter pipes, and corrosion prevention for civil engineering buildings.

Examples of medical and sanitary uses include uses for percutaneous absorbent drugs, such as analgesic anti-inflammatory agents (plasters, poultices), plasters for cold, antipruritic patches and keratin softening agents; uses for various tapes, such as first-aid plasters (containing germicide), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; binding uses in sanitary materials such as diapers and sheets for pets; cooling sheets, pocket body warmers, and uses for dust proofing, waterproofing and noxious insect capture. Exemplary uses for sealing materials of electronic/electric parts include liquid crystal monitors and solar cells.

EXAMPLES

The present invention is further described with reference to the following examples, but it should be construed that the present invention is in no way limited to those examples.

Various properties of the examples and the comparative examples were measured or evaluated by the following methods.

(1) Weight-Average Molecular Weight (Mw) and Molecular Weight Distribution (Mw/Mn) of Acrylic Block Copolymers (I-1) to (I-6).

The weight-average molecular weight was determined as a molecular weight in terms of standard polystyrene by the use of gel permeation chromatography (abbreviated to GPC hereinafter).

Apparatus: GPC apparatus "HLC-8020" manufactured by Tosoh Corporation

Separation column: "TSKgel GMHXL", "G4000HXL" and "G5000HXL" manufactured by Tosoh Corporation were connected in series.

Eluent: tetrahydrofuran

Flow rate of eluent: 1.0 ml/min

Column temperature: 40° C.

Detection method: differential refractive index (RI)

(2) Content of Each Polymer Block in Acrylic Block Copolymers (I-1) to (I-6).

The content was determined by $^1$H-NMR.

Apparatus: nuclear magnetic resonance apparatus "JNM-ECX400" manufactured by JEOL Ltd.

Solvent: deuterated chloroform

In a $^1$H-NMR spectrum of acrylic block copolymers (I-1) to (I-6) obtained in Synthesis Examples 1 to 6, signals in the vicinities of 3.6 ppm, 3.7 ppm and 4.0 ppm were assigned to an ester group of a methyl methacrylate unit (—O—CH$_3$), an ester group of a methyl acrylate unit (—O—CH$_3$), and an ester group of a n-butyl acrylate unit or a 2-ethylhexyl acrylate unit (—O—C$\underline{H}_2$—CH$_2$—CH$_2$—CH$_3$ or —O—C$\underline{H}_2$—CH(—CH$_2$—CH$_3$)—CH$_2$—CH$_2$—CH$_2$—CH$_3$), respectively, and a content of each copolymerization component was determined by a ratio of their integral values.

(3) Ratio of Monomer Constituting Polymer Block (B) in Acrylic Block Copolymers (I-1), (I-2), and (I-6).

The ratio was determined by $^1$H-NMR.

Apparatus: nuclear magnetic resonance apparatus "JNM-ECX400" manufactured by JEOL Ltd.

Solvent: deuterated chloroform

In a $^1$H-NMR spectrum of acrylic block copolymers (I-1), (I-2), and (I-6) obtained in Synthesis Examples 1, and 2 and 6, signals in the vicinities of 3.7 ppm and 4.0 ppm were assigned to an ester group of a methyl acrylate unit (—O—CH$_3$) and an ester group of a n-butyl acrylate unit or a 2-ethylhexyl acrylate unit (—O—C$\underline{H}_2$—CH$_2$—CH$_2$—CH$_3$ or O—C$\underline{H}_2$—CH(—CH$_2$—CH$_3$)—CH$_2$—CH$_2$—CH$_2$—CH$_3$), respectively, and a ratio of each of the monomers constituting the polymer block (B) was determined by a ratio of their integral values.

(4) Ratio of Monomer Constituting Polymer Block (B) in Acrylic Block Copolymer (I-5)

The content was determined by $^1$H-NMR.

Apparatus: nuclear magnetic resonance apparatus "JNM-ECX400" manufactured by JEOL Ltd.

Solvent: deuterated chloroform

In a $^1$H-NMR spectrum of a n-butyl acrylate/2-ethylhexyl acrylate mixture sampled in (1) of Synthesis Example 5, signals in the vicinities of 4.1 ppm and 4.2 ppm were assigned to an ester group of 2-ethylhexyl acrylate (—O—C$\underline{H}_2$—CH(—CH$_2$—CH$_3$)—CH$_2$—CH$_2$—CH$_2$—CH$_3$) and an ester group of n-butyl acrylate (—O—CH$_2$—CH$_2$—CH$_2$—CH$_3$), respectively, and a content based on a molar ratio of each monomer was determined by a ratio of their integral values. This content was converted into a mass ratio on the basis of the molecular weight of the monomer unit, which was then defined as a mass ratio of each of the monomers constituting the polymer block (B).

(5) Tan δ, Complex Viscosity and Storage Modulus of Viscoelasticity

Each of the block copolymers described in Table 1 was dissolved in toluene to prepare a toluene solution having a concentration of 30% by mass, and each solution was subjected to solution casting to obtain a sheet having a thickness of 1 mm. Then, dynamic viscoelasticity of the sheet in torsional vibration was measured under the following conditions to determine tan δ (loss shear modulus/storage shear modulus), complex viscosity and storage modulus.

Apparatus: "Advanced Rheometric Expansion System" manufactured by Rheometric Scientific Ltd.

Parallel plate: diameter 8 mm
Vibration mode: torsional vibration
Number of vibrations: 6.28 rad/sec
Measuring temperature range: −50° C. to 250° C.
Heating rate: 3° C./min
Strain: 0.05% (−50° C. to −37° C.), 1.0% (−37° C. to −15° C.), 5.0% (−15° C. to 250° C.)

(6) Adhesive Force

The adhesive force was measured in accordance with JIS Z0237, apart from peeling rate and sample storage method. Specifically, an adhesive tape prepared in Example or Comparative Example was cut into a width of 25 mm and a length of 100 mm, and the tape was attached to a stainless steel (SUS304) plate (bright annealing treatment (hereinafter referred to BA treatment) product) by causing a roller weighing 2 kg to reciprocate two times at a rate of 10 mm/sec. The stainless steel plate to which the adhesive tape was attached was stored at room temperature for 24 hours, and thereafter was peeled at 23° C. at a rate of 30 mm/min or 300 mm/min in the direction of 180° to measure an adhesive force. Similarly, the stainless plate to which the adhesive tape was attached was heated at 130° C. for 30 minutes, and stored at room temperature for 23.5 hours, and thereafter was peeled under the same conditions to measure an adhesive force. In the case where stick-slip occurred, the maximum value was regarded as an adhesive force. In the case where the adhesive force to the adherend was so strong that the adhesive layer came off the back base material and remained on the adherend side at the time of the peeling test, this was described as "transfer": in this case, the adhesive force to the adherend can be said to be higher than the measured value.

(7) Holding Power (SAFT)

The holding power was measured in accordance with ASTM D4498. Specifically, an adhesive tape prepared in Example or Comparative Example was cut into a width of 25 mm and a length of 25 mm, and the tape was attached to a stainless steel (SUS304) plate (BA treatment product) by causing a roller weighing 2 kg to reciprocate two times at a rate of 10 mm/sec. Then, a load of 500 g was hung down, and the temperature was raised from 40° C. to 205° C. at a rate of 0.5° C./min to determine a temperature at which the load dropped. The lower the temperature is, the lower the melt temperature is and hot-melt coating is possible at a lower temperature.

(8) Ball Tack

The ball tack was measured in accordance with JIS Z0237. Specifically, an adhesive tape prepared in Example or Comparative Example was placed so as to have an inclination angle of 30°. On the tape, balls based on ball tack method were rolled to determine a maximum number of a ball which had stopped on the adhesive tape. The smaller the number of the ball is, the lower the tack is.

<<Synthesis Example 1>> [Synthesis of Acrylic Block Copolymer (I-1)]

(1) The interior of a 2-liter three-neck flask was purged with nitrogen, and then 940 g of toluene and 46.6 g of 1,2-dimethoxyethane were introduced at room temperature. Subsequently, 37.4 g of a toluene solution containing 18.8 mmol of isobutylbis(2,6-di-tert-butyl-4-methylphenoxy)aluminum was added, and 3.15 g of a mixed solution of cyclohexane and n-hexane containing 5.37 mmol of sec-butyllithium was further added. Subsequently, to this mixed solution, 40.6 g of methyl methacrylate was added. After stirring for 60 minutes at room temperature, the polymerization conversion ratio of the methyl methacrylate was not less than 99.9%. Next, the reaction mixed solution was cooled to −30° C., and 265 g of a methyl acrylate/n-butyl acrylate mixture (mass ratio: 50/50) was dropwise added over a period of 2 hours. After the dropwise addition was completed, stirring was performed for 5 minutes at −30° C. At this time, the polymerization conversion ratio of the methyl acrylate/n-butyl acrylate mixture was not less than 99.9%. Subsequently, to the reaction mixed solution, 40.6 g of methyl methacrylate was added, and the mixture was stirred for one night at room temperature. Thereafter, 13.7 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 330 g of an acrylic block copolymer (referred to as the "acrylic block copolymer (I-1)" hereinafter).

(2) The acrylic block copolymer (I-1) obtained was subjected to $^1$H-NMR and GPC, and as a result, this copolymer was a triblock copolymer consisting of poly(methyl methacrylate)-poly(methyl acrylate/n-butyl acrylate)-poly(methyl methacrylate) and had a weight-average molecular weight (Mw) of 71,900, a number-average molecular weight (Mn) of 67,700 and a molecular weight distribution (Mw/Mn) of 1.06. The content of each polymer block in the acrylic block copolymer (I-1) was as follows: the content of the methyl methacrylate polymer block was 23.5% by mass, and the content of the (methyl acrylate/n-butyl acrylate) copolymer block was 76.5% by mass.

<<Synthesis Example 2>> [Synthesis of Acrylic Block Copolymer (I-2)]

(1) The interior of a 2-liter three-neck flask was purged with nitrogen, and then 992 g of toluene and 50.6 g of 1,2-dimethoxyethane were introduced at room temperature. Subsequently, 34.8 g of a toluene solution containing 17.5 mmol of isobutylbis(2,6-di-tert-butyl-4-methylphenoxy)aluminum was added, and 3.42 g of a mixed solution of cyclohexane and n-hexane containing 5.83 mmol of sec-butyllithium was further added. Subsequently, to this mixed solution, 38.8 g of methyl methacrylate was added. After stirring for 60 minutes at room temperature, the polymerization conversion ratio of the methyl methacrylate was not less than 99.9%. Next, the reaction mixed solution was cooled to −30° C., and 252 g of a methyl acrylate/2-ethylhexyl acrylate mixture (mass ratio: 50/50) was dropwise added over a period of 2 hours. After the dropwise addition was completed, stirring was performed for 5 minutes at −30° C. At this time, the polymerization conversion ratio of the methyl acrylate/2-ethylhexyl acrylate mixture was not less than 99.9%. Subsequently, to the reaction mixed solution, 38.8 g of methyl methacrylate was added, and the mixture was stirred for one night at room temperature. Thereafter, 13.5 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 315 g of an acrylic block copolymer (referred to as the "acrylic block copolymer (I-2)" hereinafter).

(2) The acrylic block copolymer (I-2) obtained was subjected to $^1$H-NMR and GPC, and as a result, this copolymer was a triblock copolymer consisting of poly(methyl methacrylate)-poly(methyl acrylate/2-ethylhexyl acrylate)-poly(methyl methacrylate) and had a weight-average molecular weight (Mw) of 76,400, a number-average molecular weight (Mn) of 71,800 and a molecular weight distribution (Mw/Mn) of 1.06. The content of each polymer block in the acrylic block copolymer (I-2) was as follows: the content of the methyl methacrylate polymer block was 22.0% by mass, and the content of the (methyl acrylate/2-ethylhexyl acrylate) copolymer block was 78.0% by mass.

<<Synthesis Example 3>> [Synthesis of Acrylic Block Copolymer (I-3)]

(1) The interior of a 2-liter three-neck flask was purged with nitrogen, and then 975 g of toluene and 48.1 g of 1,2-dimethoxyethane were introduced at room temperature. Subsequently, 33.0 g of a toluene solution containing 16.6 mmol of isobutylbis(2,6-di-tert-butyl-4-methylphenoxy)aluminum was added, and 3.25 g of a mixed solution of cyclohexane and n-hexane containing 5.54 mmol of sec-butyllithium was further added. Subsequently, to this mixed solution, 42.9 g of methyl methacrylate was added. After stirring for 60 minutes at room temperature, the polymerization conversion ratio of the methyl methacrylate was not less than 99.9%. Next, the reaction mixed solution was cooled to −30° C., and 279 g of n-butyl acrylate was dropwise added over a period of 2 hours. After the dropwise addition was completed, stirring was performed for 5 minutes at −30° C. At this time, the polymerization conversion ratio of the n-butyl acrylate was not less than 99.9%. Subsequently, to the reaction mixed solution, 42.9 g of methyl methacrylate was added, and the mixture was stirred for one night at room temperature. Thereafter, 12.8 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 355 g of an acrylic block copolymer (referred to as the "acrylic block copolymer (I-3)" hereinafter).

(2) The acrylic blockcopolymer (I-3) obtained was subjected to $^1$H-NMR and GPC, and as a result, this copolymer was a triblock copolymer consisting of poly(methyl methacrylate)-poly(n-butyl acrylate)-poly(methyl methacrylate) and had a weight-average molecular weight (Mw) of 78,400, a number-average molecular weight (Mn) of 72,800 and a molecular weight distribution (Mw/Mn) of 1.08. The content of each polymer block in the acrylic block copolymer (I-3) was as follows: the content of the methyl methacrylate polymer block was 23.1% by mass, and the content of the n-butyl acrylate polymer block was 76.9% by mass.

<<Synthesis Example 4>> [Synthesis of Acrylic Block Copolymer (I-4)]

(1) The interior of a 2-liter three-neck flask was purged with nitrogen, and then 975 g of toluene and 48.1 g of 1,2-dimethoxyethane were introduced at room temperature. Subsequently, 33.0 g of a toluene solution containing 16.6 mmol of isobutylbis(2,6-di-tert-butyl-4-methylphenoxy)aluminum was added, and 3.25 g of a mixed solution of cyclohexane and n-hexane containing 5.54 mmol of sec-butyllithium was further added. Subsequently, to this mixed solution, 41.0 g of methyl methacrylate was added. After stirring for 60 minutes at room temperature, the polymerization conversion ratio of the methyl methacrylate was not less than 99.9%. Next, the reaction mixed solution was cooled to −30° C., and 267 g of 2-ethylhexyl acrylate was dropwise added over a period of 2 hours. After the dropwise addition was completed, stirring was performed for 5 minutes at −30° C. At this time, the polymerization conversion ratio of the 2-ethylhexyl acrylate was not less than 99.9%. Subsequently, to the reaction mixed solution, 41.0 g of methyl methacrylate was added, and the mixture was stirred for one night at room temperature. Thereafter, 12.8 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 330 g of an acrylic block copolymer (referred to as the "acrylic block copolymer (I-4)" hereinafter).

(2) The acrylic block copolymer (I-4) obtained was subjected to $^1$H-NMR and GPC, and as a result, this copolymer was a triblock copolymer consisting of poly(methyl methacrylate)-poly(2-ethylhexyl acrylate)-poly(methyl methacrylate) and had a weight-average molecular weight (Mw) of 65,000, a number-average molecular weight (Mn) of 59,500 and a molecular weight distribution (Mw/Mn) of 1.09. The content of each polymer block in the acrylic block copolymer (I-4) was as follows: the content of the methyl methacrylate polymer block was 24.0% by mass, and the content of the 2-ethylhexyl acrylate polymer block was 76.0% by mass.

<<Synthesis Example 5>> [Synthesis of Acrylic Block Copolymer (I-5)]

(1) The interior of a 2-liter three-neck flask was purged with nitrogen, and then 975 g of toluene and 48.1 g of 1,2-dimethoxyethane were introduced at room temperature. Subsequently, 33.0 g of a toluene solution containing 16.6 mmol of isobutylbis(2,6-di-tert-butyl-4-methylphenoxy)aluminum was added, and 3.25 g of a mixed solution of cyclohexane and n-hexane containing 5.54 mmol of sec-butyllithium was further added. Subsequently, to this mixed solution, 42.9 g of methyl methacrylate was added. After stirring for 60 minutes at room temperature, the polymerization conversion ratio of the methyl methacrylate was not less than 99.9%. Next, the reaction mixed solution was cooled to −30° C., and 279 g of a n-butyl acrylate/2-ethylhexyl acrylate mixture (mass ratio 50/50), part of which was sampled, was dropwise added over a period of 2 hours. After the dropwise addition was completed, stirring was performed for 5 minutes at −30° C. At this time, the polymerization conversion ratio of the n-butyl acrylate/2-ethylhexyl acrylate mixture was not less than 99.9%. Subsequently, to the reaction mixed solution, 42.9 g of methyl methacrylate was added, and the mixture was stirred for one night at room temperature. Thereafter, 12.8 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 350 g of an acrylic block copolymer (referred to as the "acrylic block copolymer (I-5)" hereinafter).

(2) The acrylic block copolymer (I-5) obtained was subjected to $^1$H-NMR and GPC, and as a result, this copolymer was a triblock copolymer consisting of poly(methyl methacrylate)-poly(n-butyl acrylate/2-ethylhexyl acrylate)-poly(methyl methacrylate) and had a weight-average molecular weight (Mw) of 64,600, a number-average molecular weight (Mn) of 59,900 and a molecular weight distribution (Mw/Mn) of 1.08. The content of each polymer block in the acrylic block copolymer (I-5) was as follows: the content of the methyl methacrylate polymer block was 25.4% by mass, and the content of the (n-butyl acrylate/2-ethylhexyl acrylate) copolymer block was 74.6% by mass.

<<Synthesis Example 6>> [Synthesis of Acrylic Block Copolymer (I-6)]

(1) The interior of a 2-liter three-neck flask was purged with nitrogen, and then 985 g of toluene and 48.8 g of 1,2-dimethoxyethane were introduced at room temperature. Subsequently, 38.0 g of a toluene solution containing 19.1 mmol of isobutylbis(2,6-di-tert-butyl-4-methylphenoxy)aluminum was added, and 3.30 g of a mixed solution of cyclohexane and n-hexane containing 5.62 mmol of sec-butyllithium was further added. Subsequently, to this mixed solution, 28.2 g of methyl methacrylate was added. After stirring for 60 minutes at room temperature, the polymerization conversion ratio of the methyl methacrylate was not less than 99.9%. Next, the reaction mixed solution was cooled to −30° C., and 141 g of a methyl acrylate/n-butyl acrylate mixture (mass ratio: 10/90) was dropwise added over a period of 2 hours. After the dropwise addition was completed, stirring was performed for 5 minutes at −30° C. At this time, the polymerization conversion ratio of the methyl acrylate/n-butyl acrylate mixture was not less than 99.9%. Subsequently, to the reaction mixed solution, 15.1 g of methyl methacrylate was added, and the mixture was stirred for one night at room temperature. Thereafter, 14.0 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 165 g of an acrylic block copolymer (referred to as the "acrylic block copolymer (I-6)" hereinafter).

(2) The acrylic block copolymer (I-6) obtained was subjected to $^1$H-NMR and GPC, and as a result, this copolymer was a triblock copolymer consisting of poly(methyl methacrylate)-poly(methyl acrylate/n-butyl acrylate)-poly(methyl methacrylate) and had a weight-average molecular weight (Mw) of 92,300, a number-average molecular weight (Mn) of 83,600 and a molecular weight distribution (Mw/Mn) of 1.10. The content of each polymer block in the acrylic block copolymer (I-6) was as follows: the content of the methyl methacrylate polymer block was 19.2% by mass, and the content of the (methyl acrylate/n-butyl acrylate) copolymer block was 80.8% by mass.

Property values of the acrylic block copolymers (I-1) to (I-6) obtained in the above Synthesis Examples 1 to 6 are set forth in the following Table 1. In Table 1, methyl acrylate is abbreviated to MA, methyl methacrylate is abbreviated to MMA, butyl acrylate is abbreviated to nBA, and 2-ethylhexyl acrylate is abbreviated to 2EHA.

TABLE 1

|  | Synthesis Example 1 | Synthesis Example 2 | Synthesis Example 3 | Synthesis Example 4 | Synthesis Example 5 | Synthesis Example 6 |
| --- | --- | --- | --- | --- | --- | --- |
| Block copolymer | (I-1) | (I-2) | (I-3) | (I-4) | (I-5) | (I-6) |
| Compositional ratio (mass ratio) in polymer block (B) | MA/nBA 50/50 | MA/2EHA 50/50 | nBA 100 | 2EHA 100 | nBA/2EHA 50/50 | MA/nBA 10/90 |
| Mw of block copolymer | 71,900 | 76,400 | 78,400 | 65,000 | 64,600 | 92,300 |
| Mw/Mn of block copolymer | 1.06 | 1.06 | 1.08 | 1.09 | 1.08 | 1.10 |

TABLE 1-continued

|  | Synthesis Example 1 | Synthesis Example 2 | Synthesis Example 3 | Synthesis Example 4 | Synthesis Example 5 | Synthesis Example 6 |
|---|---|---|---|---|---|---|
| MMA content (mass %) in block copolymer | 23.5 | 22.0 | 23.1 | 24.0 | 25.4 | 19.2 |
| Peak temperature (° C.) of tanδ | 25 | 8 | −33 | −44 | −40 | −24 |
| Complex viscosity (130° C.) (Pa · s) | 5,200 | 3,600 | 16,200 | 30,900 | 35,500 | 9,000 |
| Storage shear modulus G' (130° C.) (Pa) | 5,900 | 4,500 | 94,800 | 191,000 | 215,000 | 47,300 |
| Storage shear modulus (Log G') | 3.8 | 3.7 | 5.0 | 5.3 | 5.3 | 4.7 |

Examples 1 and 2, Comparative Examples 1 to 4

In Examples and Comparative Examples, each of the acrylic block copolymers shown in Table 2 was dissolved in toluene to prepare a toluene solution containing 35% by mass of solid contents. Then, a polyethylene terephthalate film (Toyobo Ester Film E5000, thickness: 50 μm) was coated with the above toluene solution by a coater so that the thickness of the adhesive layer after drying would become 25 μm, and thereafter, the film was subjected to drying at 60° C. for 30 minutes to prepare an adhesive tape. Various properties of the resulting adhesive tape were evaluated by the aforesaid methods. The results are shown in the following Table 2.

TABLE 2

|  | Example 1 | Example 2 | Comparative Example 1 | Comparative Example 2 | Comparative Example 3 | Comparative Example 4 |
|---|---|---|---|---|---|---|
| Block copolymer | (I-1) | (I-2) | (I-3) | (I-4) | (I-5) | (I-6) |
| SUS adhesive force (N/25 mm) room temperature, 24 hrs |  |  |  |  |  |  |
| Peel rate 30 mm/min | 7.5* | 10.6 | 7.3 | 1.4 | 5.7 | 16.6 |
| Peel rate 300 mm/min | 2.1* | 7.0* | 11.4 | 4.8 | 9.9 | 14.9 |
| SUS adhesive force (N/25 mm) 130° C., 30 min + room temperature, 23.5 hrs |  |  |  |  |  |  |
| Peel rate 30 mm/min | 30.8 | 17.6 | 8.5 | 2.6 | 8.5 | 17.9 |
| Peel rate 300 mm/min | 13.0** | 20.4 | 12.2 | 4.0 | 9.5 | 22.1 |
| SAFT (temperature at which drop occurred: ° C.,) | 116 | 121 | 150 | 197 | 166 | 145 |
| Ball tack | <1 | <1 | 4 | 8 | 6 | 2 |

*stick slip
**stick slip + transfer

According to the results of Table 2, the adhesives of Examples 1 and 2 composed of the acrylic block copolymers (I-1) and (I-2), respectively, fulfilling the requirements of the present invention, have low adhesive force and tack at room temperature, and through heat treatment at a relatively low temperature of 130° C. can have increased adhesive force. Such adhesives are easily peelable if unsuccessfully attached, and after heat treatment can be used favorably as a hot-melt adhesive which does not come off. The adhesives of Examples 1 and 2 have a low tack, and thus in their processing into sheets, can be provided in the form of a roll without using a separate film on the back side of the base material. In this way, from the viewpoint of reducing waste, too, the hot-melt adhesive can be used as an excellent one. By contrast, the adhesives of Comparative Examples 1 to 4 using the acrylic block copolymers (I-3) to (I-6), respectively, failing to fulfill the requirements of the present invention, have a high tack, and a high adhesive force at room temperature, and therefore it is difficult to peel them off when they are unsuccessfully attached.

INDUSTRIAL APPLICABILITY

The hot-melt adhesive composition of the present invention has a low melt viscosity and thus can adhere through hot melt coating at low temperature and heat treatment at low temperature. Also, the hot-melt adhesive composition of the present invention has a low tack, with a result that an adhesive product having an adhesive layer manufactured from that adhesive composition, even if unsuccessfully attached to an adherend, is easily re-attachable. Further, by positioning the hot-melt adhesive composition accurately on an adherend followed by heat-treating, the adhesive layer comes to have sufficiently high adhesive force, with a result that the adhesive product can adhere to the adherend at a sufficient adhesive strength. Furthermore, an adhesive product, such as an adhesive sheet and an adhesive film, using the hot-melt adhesive composition of the present invention, may be provided in the form of a roll in which the adhesive product is wound around a roll with no protective film layers provided on the adhesive layer, and in this case, the adhesive layer hardly adheres to the base layer. Thus, by unwinding the rolled adhesive product with no protective film layers at a site where the adhesive product is to be used, the adhesive product can be used as an adhesive sheet and an adhesive film. From the foregoing reasons, the hot-melt adhesive composition of the present invention is useful.

The invention claimed is:

1. A hot-melt adhesive composition comprising an acrylic block copolymer (I) having at least one polymer block (A) comprising methacrylic acid ester units and at least one polymer block (B) comprising acrylic acid ester units,
wherein:
the acrylic acid ester units of the polymer block (B) are prepared from an acrylic acid ester (1) which is methyl acrylate and an acrylic acid ester (2) represented by formula $CH_2$=CH—$COOR^2$, wherein $R^2$ is an organic group having 4 to 12 carbon atoms, a mass ratio (1)/(2) of the acrylic acid ester (1) to the acrylic acid ester (2) is in a range of 90/10 to 25/75, and the acrylic block copolymer (I) has a structure of a linear block copolymer, and has a ratio, Mw/Mn, of a weight-average molecular weight, Mw, to a number-average molecular weight, Mn, in a range of 1.0 to 1.5.

2. The hot-melt adhesive composition according to claim 1, wherein the polymer block (B) in the acrylic block copolymer (I) has a glass transition temperature of −30 to 30° C., and the polymer block (A) in the acrylic block copolymer (I) has a glass transition temperature of 80 to 140° C.

3. The hot-melt adhesive composition according to claim 1, wherein the acrylic block copolymer (I) has at least one peak temperature of tan δ, loss shear modulus/storage shear modulus, present in the range of from −20 to 40° C., the tan δ being determined from dynamic viscoelasticity in torsional vibration.

4. The hot-melt adhesive composition according to claim 1, wherein the acrylic block copolymer (I) has a complex viscosity at 130° C. of not more than 15,000 Pa·s as measured with a torsion-type dynamic viscoelasticity measuring instrument.

5. The hot-melt adhesive composition according to claim 1, wherein the acrylic block copolymer (I) has a weight-average molecular weight, Mw, of 30,000 to 300,000.

6. The hot-melt adhesive composition according to claim 1, wherein the acrylic acid ester (2) is n-butyl acrylate or 2-ethylhexyl acrylate.

7. The hot-melt adhesive composition according to claim 1, which is subjected to thermosensitive adhesion processing or hot-melt coating processing at a temperature not higher than 140° C.

8. The hot-melt adhesive composition according to claim 1, wherein a content of the acrylic block copolymer (I) is not less than 40% by mass relative to a total amount of solid contents of the hot-melt adhesive composition.

9. A laminate obtained by laminating a layer comprising the hot-melt adhesive composition according to claim 1 with at least one base layer.

10. A label having the laminate according to claim 9.

11. A thermosensitive adhesive sheet having a layer comprising the hot-melt adhesive composition according to claim 1.

12. The hot-melt adhesive composition according to claim 1, wherein the ratio, Mw/Mn, of the weight-average molecular weight, Mw, to the number-average molecular weight, Mn, in the acrylic block copolymer (I), is in a range of 1.0 to 1.4.

13. The hot-melt adhesive composition according to claim 1, wherein the ratio, Mw/Mn, of the weight-average molecular weight, Mw, to the number-average molecular weight, Mn, in the acrylic block copolymer (I), is in a range of 1.0 to 1.3.

14. The hot-melt adhesive composition according to claim 1, wherein the acrylic acid ester (2) is n-butyl acrylate.

15. The hot-melt adhesive composition according to claim 1, wherein the acrylic acid ester (2) is 2-ethylhexyl acrylate.

* * * * *